United States Patent
Canti (10) Patent No.: US 12,397,448 B2
(45) Date of Patent: Aug. 26, 2025

(54) TOOL CHANGER FOR A ROBOT AND CHANGING SYSTEM THEREFOR

(71) Applicant: SCHUNK GmbH & Co. KG Spann-und Greiftechnik, Lauffen am Neckar (DE)

(72) Inventor: Hasan Canti, Dortmund (DE)

(73) Assignee: SCHUNK GmbH &Co. KG Spann-und Greiftechnik, Lauffen am Neckar (DE)

( * ) Notice: Subject to any disclaimer, the term of this patent is extended or adjusted under 35 U.S.C. 154(b) by 810 days.

(21) Appl. No.: 17/628,416

(22) PCT Filed: Jul. 16, 2020

(86) PCT No.: PCT/EP2020/070214
§ 371 (c)(1),
(2) Date: Jan. 19, 2022

(87) PCT Pub. No.: WO2021/013709
PCT Pub. Date: Jan. 28, 2021

(65) Prior Publication Data
US 2022/0234218 A1  Jul. 28, 2022

(30) Foreign Application Priority Data
Jul. 19, 2019 (DE) .................. 10 2019 119 657.4

(51) Int. Cl.
*B25J 15/04* (2006.01)
(52) U.S. Cl.
CPC ......... *B25J 15/045* (2013.01); *B25J 15/0408* (2013.01); *Y10T 279/1062* (2015.01)

(58) Field of Classification Search
CPC ................ B25J 15/0047; B25J 15/0408; B25J 15/0433; B25J 15/045; Y10T 279/1037; Y10T 279/1062
See application file for complete search history.

(56) References Cited

U.S. PATENT DOCUMENTS

| | | |
|---|---|---|
| 4,698,898 A | 10/1987 | Horsch |
| 5,083,352 A | 1/1992 | Nakako |
| (Continued) | | |

FOREIGN PATENT DOCUMENTS

| | | |
|---|---|---|
| CN | 102848210 A | 1/2013 |
| CN | 203610997 U | 5/2014 |
| (Continued) | | |

OTHER PUBLICATIONS

English Translation of Office Action, dated Jul. 7, 2020. pp. 1-5.
(Continued)

*Primary Examiner* — Eric A. Gates
(74) *Attorney, Agent, or Firm* — BOND, SCHOENECK & KING, PLLC; George R. McGuire (57) ABSTRACT

The invention relates to a tool changer for a robot, including a base unit, a changing unit, which can be locked on the base unit, movable locking elements, which are provided on the base unit, receptacles, which are provided on the changing unit, the locking elements interacting, in a locking position, with the receptacles in order to lock the changing unit on the base unit and releasing, in an unlocking position, the receptacles, and a rotary element, which is provided on the base unit and is mounted for rotation about the longitudinal axis of the rotary element, the locking elements being movement-coupled to the rotary element in such a way that the locking elements are moved when the rotary element is rotated.

11 Claims, 5 Drawing Sheets

(56) References Cited

U.S. PATENT DOCUMENTS 5,328,180 A * 7/1994 Benavides ........... B25J 15/0273
279/2.19
5,360,249 A 11/1994 Monforte

FOREIGN PATENT DOCUMENTS

| | | | |
|---|---|---|---|
| CN | 106272497 A * | 1/2017 | ............ B25J 13/088 |
| DE | 3346467 A1 | 7/1985 | |
| DE | 3713619 A1 | 11/1988 | |
| DE | 4010070 C1 | 11/1991 | |
| DE | 112009002163 T5 | 7/2011 | |
| EP | 3251796 A1 | 12/2017 | |
| GB | 2202572 A | 9/1988 | |
| KR | 20180121035 A | 11/2018 | |
| KR | 20180121036 A * | 11/2018 | |

OTHER PUBLICATIONS

Translated International Search Report and Written Opinion of International Application PCT/EP2020/070214, filed Jul. 16, 2020. Mailing date of Search Report, Nov. 12, 2020. pp. 1-10.
Official CN Notification, dated Oct. 19, 2022. pp. 1-6.

* cited by examiner

TOOL CHANGER FOR A ROBOT AND CHANGING SYSTEM THEREFOR

CROSS REFERENCE TO RELATED APPLICATIONS

This is a National Stage Application filed under 35 U.S.C. 371 based on International Patent Application No. PCT/EP2020/070214, filed on Jul. 16, 2020, which claims priority to German Patent Application 10 2019 119 657.4 filed Jul. 19, 2019. The entire disclosures of each of the foregoing are hereby incorporated herein by reference in their entireties.

BACKGROUND

Field of Invention

The invention relates to a tool changer for a robot, comprising a base unit, a changing unit which can be locked on the base unit, movable locking elements which are provided on the base unit, and receptacles which are provided on the changing unit, the locking elements interacting with the receptacles in a locking position in order to lock the changing unit on the base unit and releasing the receptacles in an unlocking position, said tool changer also comprising a rotary element which is provided on the base unit and rotatably mounted about its longitudinal axis, the locking elements being movement-coupled to the rotary element in such a way that the locking elements are moved when the rotary element is rotated.

The base unit is in particular designed in such a way that it can be arranged on the free end of a robot arm. The changing unit is in particular designed in such a way that it is configured for arrangement on a tool or gripping unit.

Description of Prior Art

Robots are used in industrial assembly lines and for other manufacturing applications to perform repetitive tasks with a high degree of accuracy. For example, robots are commonly used in the automotive industry to perform a number of tasks such as material handling, cutting, welding, joining, and the like.

A tool changer as mentioned at the outset is known, for example, from DE 112009002163 T5. The locking elements are designed as rolling bodies here. In this case, a piston with cam faces having several facets that act against the rolling bodies is known as a rotary element for activating the locking elements.

Furthermore, a machine tool having a tool changing device is known from DE 33 46 467 A1. The tool changing device has a double-ended changing arm which is arranged so as to be pivotable about an axis parallel to the spindle axis and is provided with a tool gripper at each end.

A tool changing apparatus for a welding robot is known from DE 40 10 070 C1. Two closure hooks are provided as locking elements. A piston acts on a toggle joint in a spring-loaded manner such that the closure hooks are spread apart and two base plates are oriented and braced against one another in a locking position. In order to release the connection, pressure is applied to the piston counter to the spring force.

A gripper changing coupling is known from DE 37 13 619 A1. The locking mechanism comprises an adapter plate on which two centering pegs are provided. These are received in a centering bore and locked with a perpendicularly movable locking plate, the locking plate having two recesses, the wheels of which engage lockingly in undercuts on the centering pegs upon perpendicular movement.

SUMMARY OF THE INVENTION

The problem addressed by the present invention is that of providing a tool changer of the type mentioned at the outset in which the locking elements act against the receptacles in the locking position with a relatively high degree of force. The locking elements should be moved as quickly as possible at the same time.

This problem is solved by a tool changer having the features of claim 1. In a tool changer of this kind, the rotary element is in particular movement-coupled to a rotationally fixed and axially movable actuation element such that, when the rotary element is rotated, the actuation element changes its position in the axial direction. The rotary element as such can also change its axial position; however, it is also conceivable for the rotary element and the actuation element to be movement-coupled to one another in such a way that the rotary element does not change its axial position when it is rotated. Furthermore, the actuation element is movement-coupled to or forms a pivot pin which extends perpendicularly to the longitudinal axis of the actuation element, a joint pin is provided on each of the locking elements, and, between the pivot pin and each joint pin, at least one lever arm is provided. Each lever arm is designed in such a way that, when the pivot pin is moved in the axial direction, the joint pins and thus also the locking elements are moved in a perpendicular direction running perpendicularly to the axial direction. A plurality of lever arms can also be provided between the pivot pin and each joint pin. Providing such an activation mechanism for the locking elements has the advantage that, by using the lever arms, the locking elements can cover relatively long distances with relatively little force as long as they are not in the locking position. Then, when the locking elements come into the region of the locking position, they cover relatively short distances while providing a relatively high degree of force. By providing the lever arms, the movement of the actuation element in the axial direction can also be advantageously deflected into a movement of the locking elements in the perpendicular direction. Overall, the movement of the pivot pin and the joint pin can also take place in relatively wear-free manner.

It is advantageous for the joint pin and the pivot pin to be circular-cylindrical and arranged so as to run parallel to one another.

In contrast to the known prior art as represented by DE 11 2009 002 163 T5, no rolling bodies which are exposed to high loads and high wear due to the relative movements of the components movement-coupled thereto are used.

Furthermore, it is also advantageous for the rotary element to comprise a head and a threaded rod, the head being rotatable by means of a rotary tool and the threaded rod being rotatably mounted in a threaded sleeve that is arranged on the base unit in a rotationally fixed manner. The threaded rod and the threaded sleeve can interact directly; the thread of the threaded rod then engages in a thread of the threaded sleeve. However, it is also conceivable for rolling bodies to be provided between the threaded rod and the threaded sleeve in order to minimize the friction between the threaded rod and the threaded sleeve. The rotary tool can be a hand-operated rotary tool or a machine-operated rotary tool. Providing a machine-operated rotary tool has the advantage that the rotary element can be operated in an automated manner.

The actuation element is advantageously provided on the rotary element on the side of the rotary element facing away from the head so as to be rotationally decoupled in the axial direction. The rotational decoupling can be implemented, for example, in such a way that the actuation element passes through and undercuts a coupling portion of the rotary element.

In a further advantageous embodiment, the head has an engagement surface for the rotary tool and a securing element which interacts with the engagement surface to secure the rotary element against rotation is provided on the base unit. The securing element is designed in such a way that it disengages from a securing position into a release position when the rotary tool is placed on the head or when the rotary tool is rotated. The securing element can, for example, be a securing wedge which is spring-loaded in the axial direction and which abuts a flat portion of the head and thereby prevents the rotary element from rotating. When the rotary tool is attached, this securing wedge can be moved backward in the axial direction from the securing position into the release position, as a result of which the rotary element can be rotated.

Furthermore, the two lever arms are preferably arranged one above the other and/or so as to adjoin one another, at least in portions. This results in a space-saving arrangement.

It is also advantageous for the locking elements to be designed as slide elements mounted in the base unit in a guided manner. The slide elements are in particular mounted so as to be guided in such a way that they can only move in the direction of rotation. In this way, a clear direction of movement of the slide elements can be specified.

The slide elements can in particular provide wedge portions on the side facing the respective receptacles. The receptacles can in particular be designed as complementary wedge receptacles.

It is also advantageous for the receptacles to be designed to be at least partially elastically yielding and/or to be arranged on the changing unit so as to be at least partially elastic. The receptacles can thus be deflected in an elastically yielding manner when the locking position is reached, as a result of which the locking elements act against the receptacles under a preload in the locking position. The advantage of providing such a preload is that it is possible to compensate for play resulting in particular from manufacturing tolerances.

It is advantageous if spring elements are provided which act on the receptacles against the changing unit in a spring-preloaded manner. In particular, spiral or disc springs can be used as spring elements.

It has also proven to be advantageous if, in the unlocking position, the connecting axes between the respective joint pins and the pivot pin form an angle α with the axial direction in the range of from 30° to 60°, and preferably in the range of from 40° to 50°, and/or if, in the locking position, the connecting axes between the respective joint pins and the pivot pin form an angle α with the axial direction in the range of from under 94° to over 90°. This ensures that a high degree of force transmission can be provided by the lever arms, particularly in the locking position; consequently, locking takes place with a relatively high degree of force overall.

It is also advantageous for a displaceable axial stop to be provided for adjusting the end position of the actuation element in the axial direction. When the end position is adjusted, the angle α can ultimately also be adjusted in the locking position.

According to a further embodiment of the invention, it is conceivable for positioning recesses or positioning rods by means of which the changing unit can be precisely positioned at a changing station to be provided on the changing unit. This makes it possible to ensure that the changing unit, in particular when it is detached from the base unit, can be mounted at a changing station.

The aforementioned problem is also solved by a changing system comprising a tool changer according to the invention, also comprising a changing station, wherein the changing station has a rotary tool for rotating the rotary element and wherein the changing station has positioning rods or positioning recesses by means of which the changing unit can be positioned at the changing station. A fully automated activation of the tool changer can therefore be achieved by such a changing system.

Further details and advantageous embodiments of the invention can be found in the following description, on the basis of which one embodiment of the invention will be described and explained in more detail.

DETAILED DESCRIPTION

A tool changer 10 which comprises a base unit 12 and a changing unit 14 is shown in the drawings. A changing station 16 at which the tool changer 10 can be docked in order to release the changing unit 14 from the base unit 12 is also shown, in particular in FIGS. 1 to 5. The tool changer 10 and the changing station together form a changing system 18.

Figure 1:
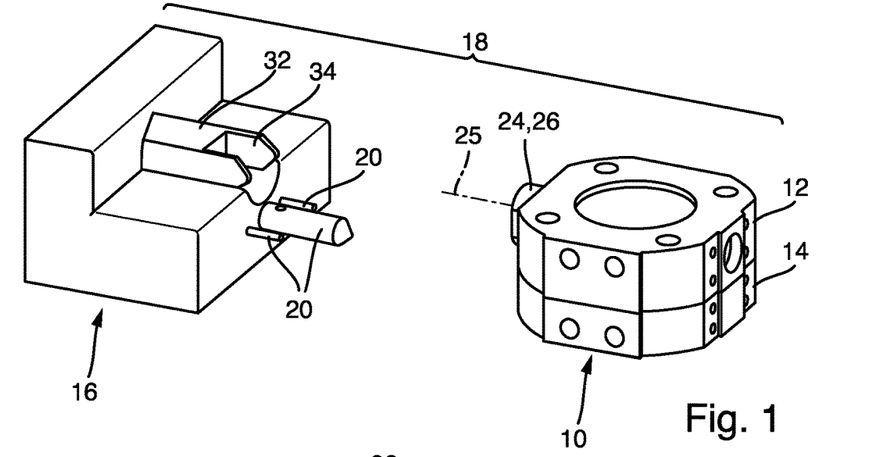
FIG. 1 shows a changing system comprising a tool changer and comprising a changing station.
Figure 2:
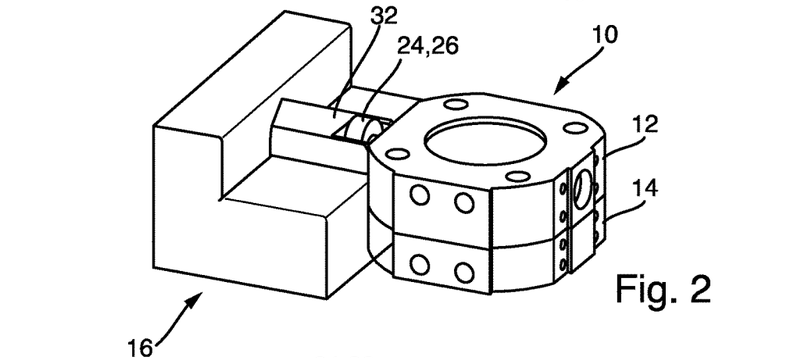
FIG. 2 shows the tool changer according to FIG. 1.

The base unit 12 can be arranged on the free end of a robot arm. Using the robot arm, which is not shown in the drawings, the base unit 12 can be moved freely in space and, inter alia, can also be moved toward the changing station 16. During operation, in particular a tool or a handling system, such as a gripping device, is arranged on the changing unit 14 in order to process or handle components. The changing unit 14 can be detached from the base unit 12 in order to exchange the tool or the handling unit. For this purpose, the tool changer 10, i.e. the base unit 12 together with the changing unit 14, is moved to the changing station 16, as is shown in FIG. 2. In order to achieve positionally accurate docking of the tool changer 10 at the changing station 16, three positioning rods 20 are provided on the changing station 16, which rods can enter the positioning recesses 22 provided on the changing unit 14, as indicated in FIG. 6.

Figure 3:
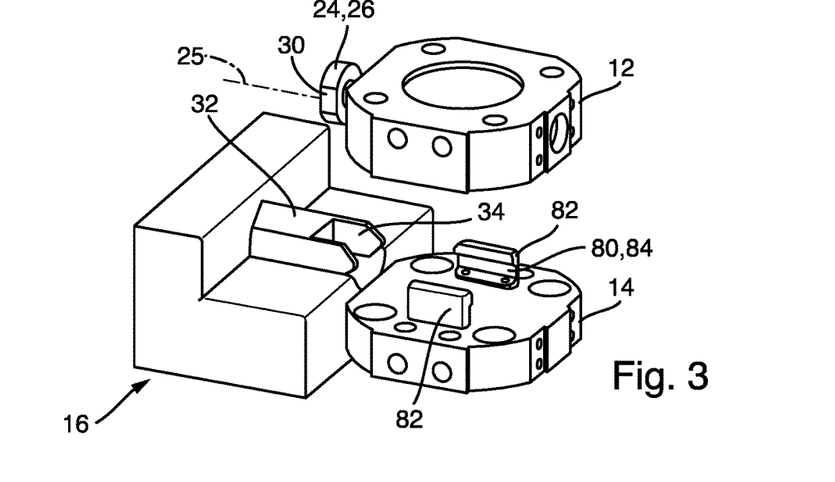
FIG. 3 shows the changing system according to FIG. 2 with the changing unit unlocked.
Figure 4:
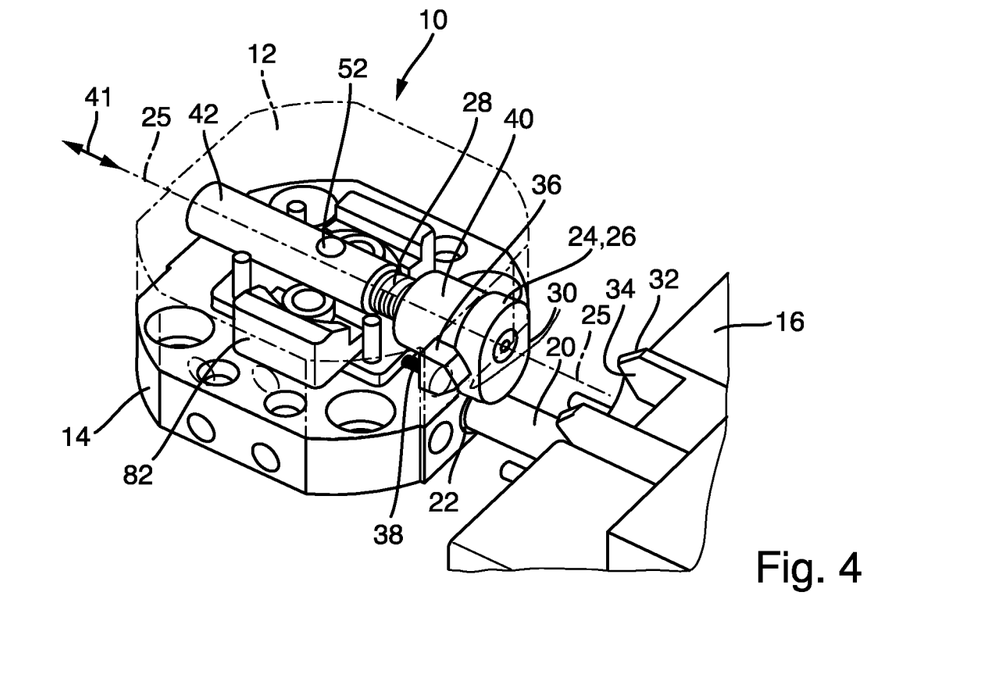
FIG. 4 is a section from the changing system according to FIG. 1 when moving the tool changer to the changing station.
Figure 5:
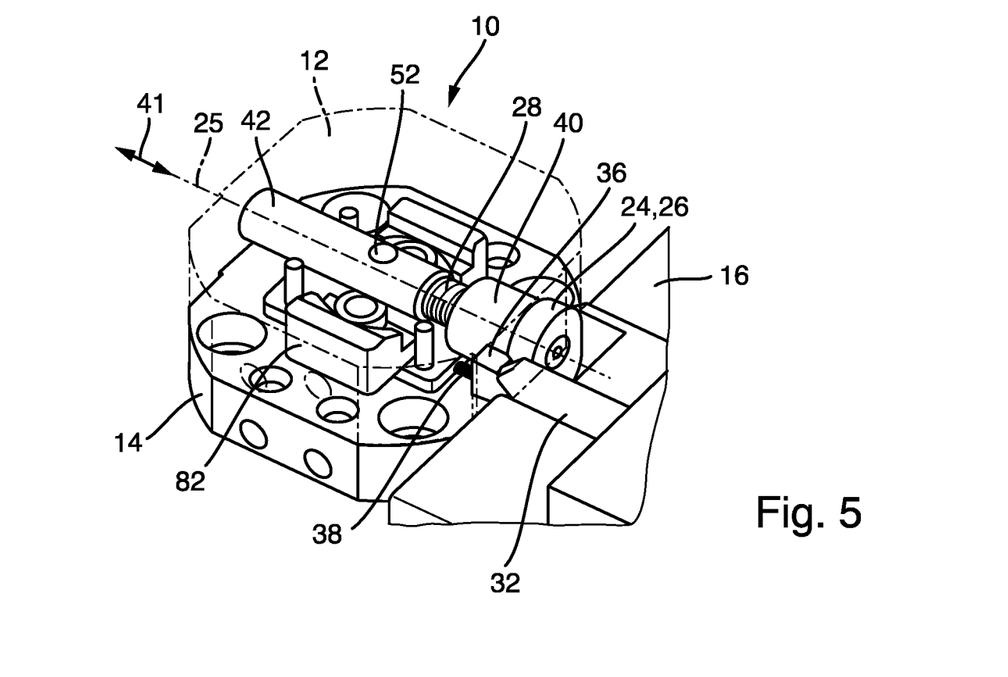
FIG. 5 is the view according to FIG. 4 with the tool changer arranged at the changing station.

As can be seen in FIGS. 1 to 5, a rotary element 24, which is mounted so as to be rotatable about its longitudinal axis 25, is provided on the base unit 12. FIGS. 4 and 5 show the housing of the base unit 12 with dashed lines only in order to make the components within the base unit 12 visible.

Figure 6:
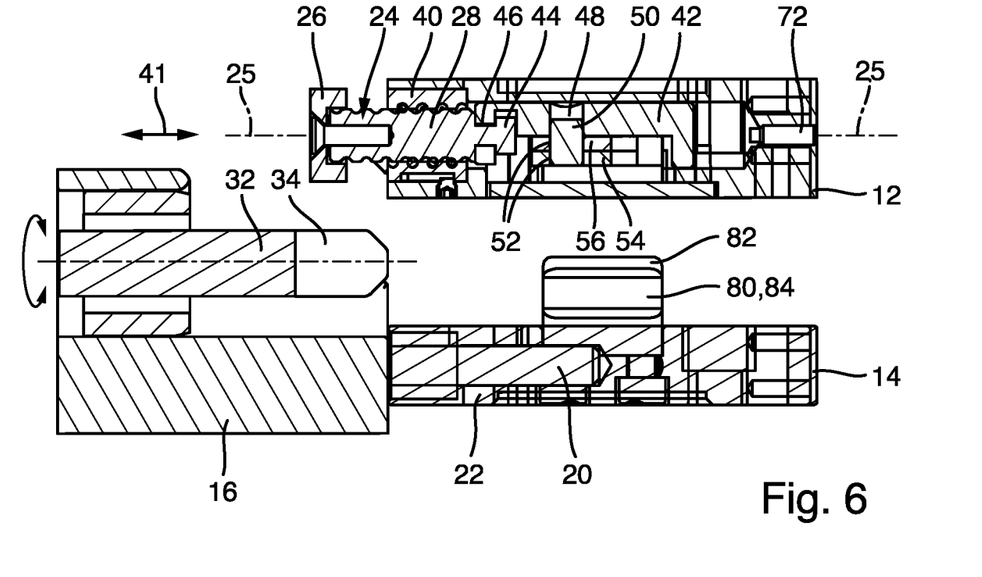
FIG. 6 is a longitudinal section through the changing system according to FIG. 3.

As can be seen in particular from the section according to FIG. 6, the rotary element 24 comprises a head 26 and a threaded rod 28. The head 26 has engagement surfaces on two opposite sides in the form of flat portions 30 for a rotatably drivable rotary tool 32. As can be seen from FIGS. 1 to 5 in particular, the rotary tool 32 has a fork-like design and is arranged on the changing station 16 so as to be rotatably drivable. The rotary tool 32 has engagement surfaces 34 which are formed parallel to the flat portions 30. When the tool changer 10 is docked at the changing station 16, the engagement surfaces 34 of the rotary tool 32 consequently abut the flat portions 30 of the head 26, as can be seen from FIGS. 2 and 5.

As can be seen in particular from FIGS. 4 and 5, a securing element 36 is also provided on the base unit 12, which securing element interacts with one of the flat portions 30 to secure the rotary element 24 against rotation. The securing element 36 is preloaded by means of spring elements 38 in the axial direction, i.e. in the direction of the longitudinal axis 25 toward the changing station 16. Rotation of the rotary element 24 is thus not possible when the tool changer 10 is not docked at the changing station 16. If the tool changer 10 is located at the changing station 16, as shown in FIG. 5, the rotary tool 32 interacts with the securing element 36 in such a way that, when the rotary tool 32 is rotated, it disengages from the securing position of the securing element 36 shown in FIG. 4 into a release position shown in FIG. 5. In order to achieve safe disengagement against the preloading force of the spring elements 38, each of the mutually facing sides of the securing element 36 and of the rotary tool 32 is wedge-shaped.

As can be seen in particular from the section according to FIG. 6, the threaded rod 28 of the rotary element 24 is rotatably mounted in a threaded sleeve 40. In order to achieve the smoothest possible rotation of the rotary element 24 in the threaded sleeve 40, rolling bodies are provided between the threaded rod 28 and the threaded sleeve 40. However, it is also conceivable for the threaded rod 28 to act directly against the threaded sleeve 40. By providing the threaded sleeve 40, it becomes possible for the rotary element 24 to change its position in the axial direction, i.e. in the direction along the longitudinal axis 25, when the rotary element 24 is rotated about its longitudinal axis 25. The axial direction is indicated by the double arrow 41.

As can also be seen from FIGS. 4 to 8, the rotary element 24 is movement-coupled in the axial direction 41 to a rotationally fixed and axially movable actuation element 42. The actuation element 42 adjoins the rotary element 24 on the side of the rotary element facing away from the head 26 so as to be rotationally decoupled in the axial direction 41. For rotational decoupling and simultaneous axial movement coupling, the rotary element 24 has, as can be seen from FIG. 6, an undercut 44 which engages behind an opening 46 of the actuation element 42, which opening faces the rotary element 24. This ensures that rotation of the rotary element 24 results in movement of the actuation element in the axial direction 41 without the actuation element 42 being rotated about the longitudinal axis 25.

As can also be seen in particular from FIG. 6, the actuation element 42 has a bore 48 which extends perpendicularly to the longitudinal axis 25 and in which a pivot pin 50 is provided. The pivot pin 50 consequently extends perpendicularly to the longitudinal axis 25 or perpendicularly to the axial direction 41.

As can also be seen from FIG. 6, the pivot pin 50 extends not only through the bore 48 of the actuation element 42, but also through two further bores 52, which are provided on respective lever arms 54, 56. The two lever arms 54 and 56, which can be seen in particular in FIGS. 9 to 11, each interact with respective joint pins 58, which are in turn provided on respective locking elements 60, 62.

Figure 7:
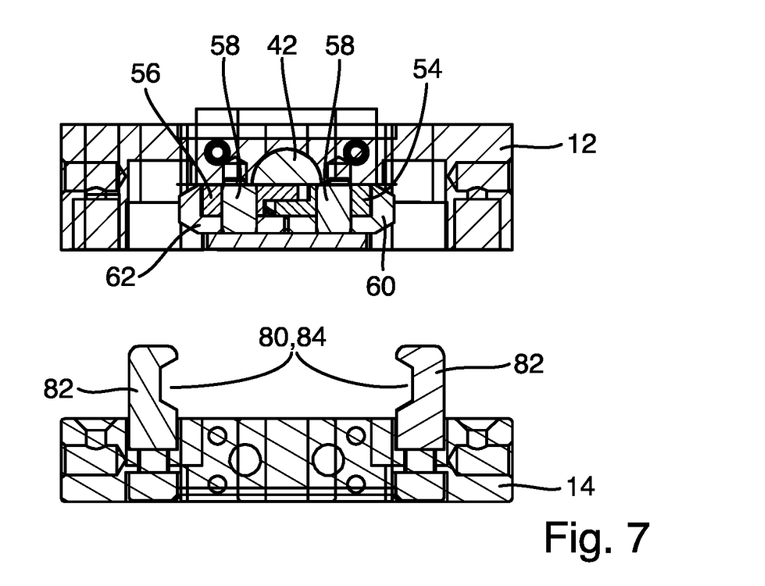
FIG. 7 is a cross section through the changing system according to FIG. 8.

Receptacles 80 for locking the changing unit 14 to the base unit 12 are shown on the changing unit in FIGS. 3, 6, and 7, which receptacles are designed as wedge grooves 84 provided in bridge portions 82. The locking elements 60, 62 that interact with the receptacles 80 are provided on the base unit 12 and each have a wedge portion 86, which is designed to be complementary to the wedge grooves 84, at the free ends thereof. The locking elements 60, 62 having the wedge portions 86 can be seen in particular in FIGS. 9 and 10.

Figure 10:
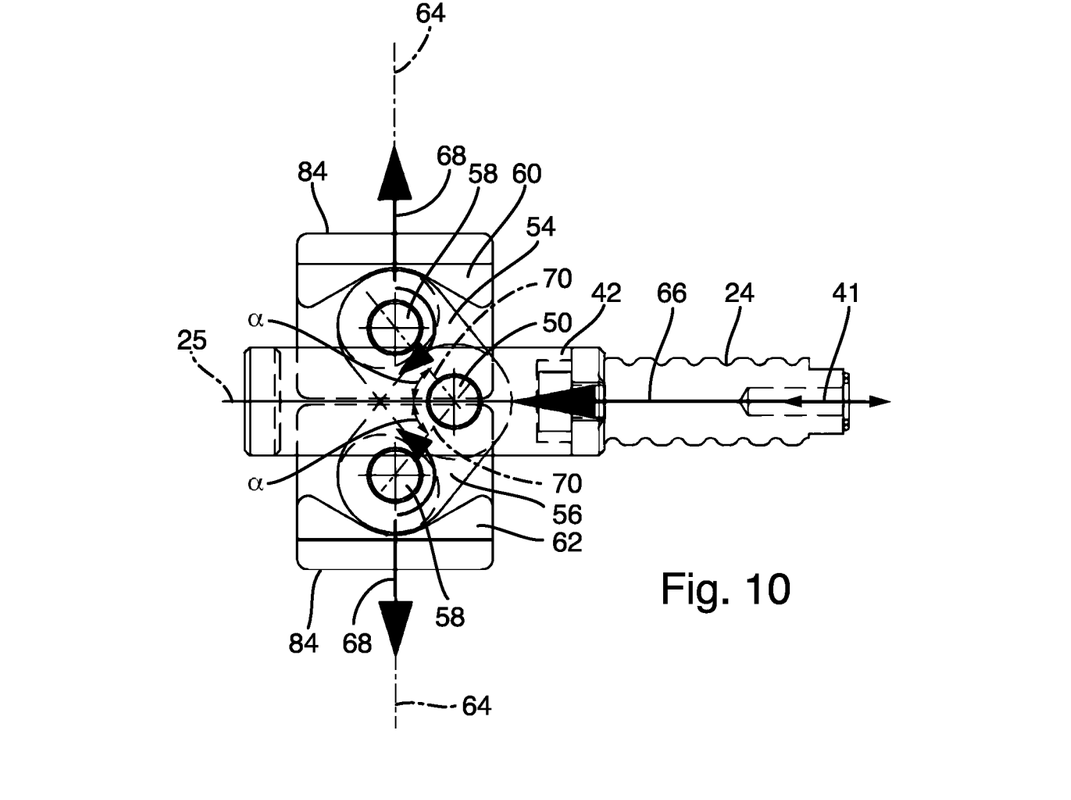
FIG. 10 shows the locking elements of the base unit with the associated movement mechanism in the unlocking position.
Figure 11:
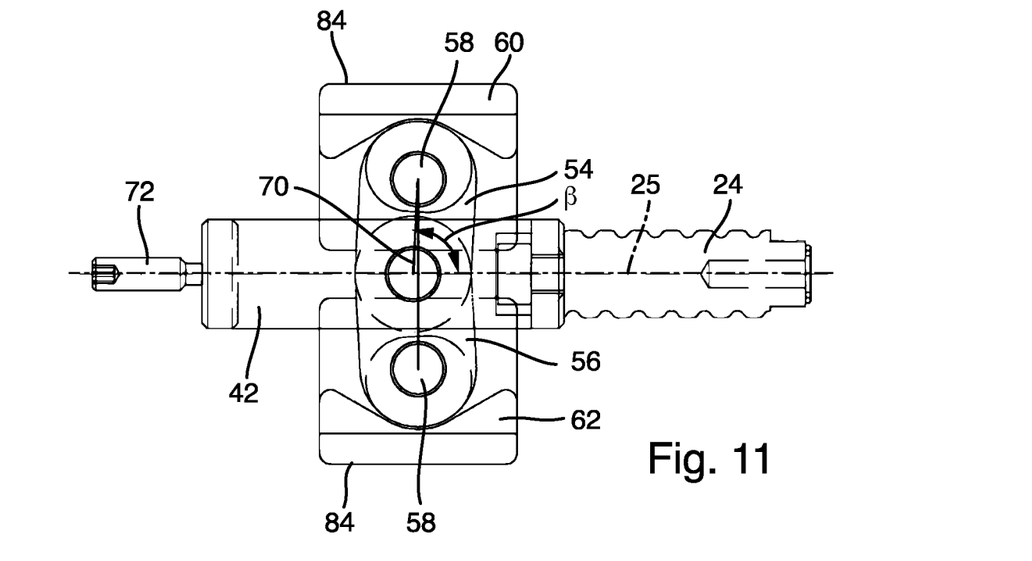
FIG. 11 is a view corresponding to FIG. 10 in the locking position.

By moving the actuation element 42 in the axial direction, as illustrated in FIG. 10, the two locking elements 60, 62 can be moved from an unlocking position shown in FIG. 10 into a locking position shown in FIG. 11. For this purpose, the locking elements 60, 62 move along a perpendicular axis 64 that runs perpendicularly to the longitudinal axis 25 in a perpendicular direction indicated by the arrows 68. If, according to FIG. 10, the actuation element 42 is moved in the direction of the arrow 66 along the longitudinal axis 25 in the axial direction 41, the locking elements 60, 62 are moved along the perpendicular axis 64 in the perpendicular direction 68 due to the mechanism of the lever arms 54, 56.

In the unlocking position of the locking elements 60, 62 shown in FIG. 10, the connecting axes 70, which run between the centers of the joint pins 58 and the center of the pivot pin 50, each form an angle α of 45° with the longitudinal axis 25. In the locking position shown in FIG. 11, the axes 70 form an angle β of approximately 88° with the longitudinal axis 25. This means that, proceeding from FIG. 10, the locking elements 60, 62 are first moved relatively quickly in the direction of the arrows 68 with relatively little force. When the locking position, as shown in FIG. 11, is reached, the movement of the locking elements 60, 62 is slowed down due to the kinematics provided, but the locking force is increased accordingly. The angle β is selected as to be less than 90°.

In order to ensure that the angle β is less than 90°, an axial stop 72 that is displaceable in the axial direction 41 is shown in FIG. 11. The axial stop 72 is designed here as a threaded pin which can be screwed into the housing of the base unit 12, as shown in FIG. 9.

Figure 9:
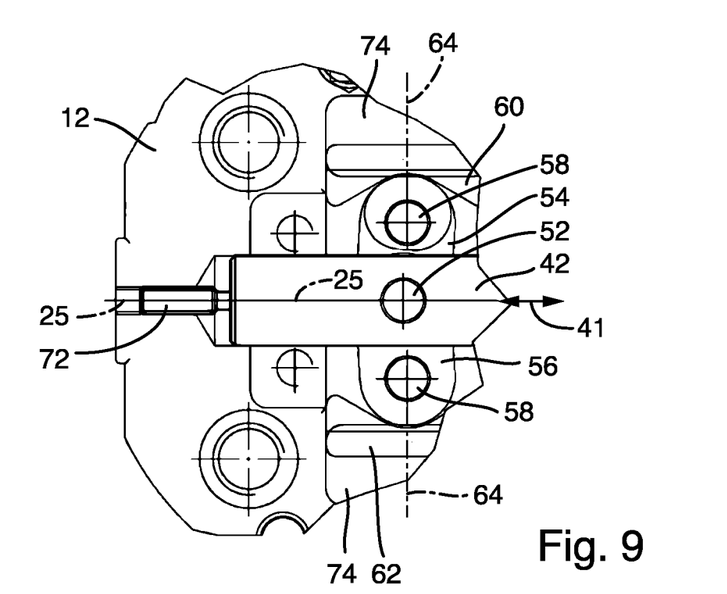
FIG. 9 is a detail of a plan view of the base part without the housing.

In order to ensure that the locking elements 60, 62 move along the perpendicular axis 64 when the actuation element 42 is moved, guide pockets 74, shown in FIG. 9, in which the locking elements 60, 62 are slidably arranged are provided in the housing of the changing unit 14.

If, proceeding from FIG. 11, the actuation element 42 is moved back, i.e. to the right, by rotation of the rotary element 24 in the other direction, the locking elements 60, 62 move from the locking position shown in FIG. 11 back into the unlocking position shown in FIG. 10 along the perpendicular axis 64 counter to the directions of the arrows 68 in FIG. 10.

Figure 8:
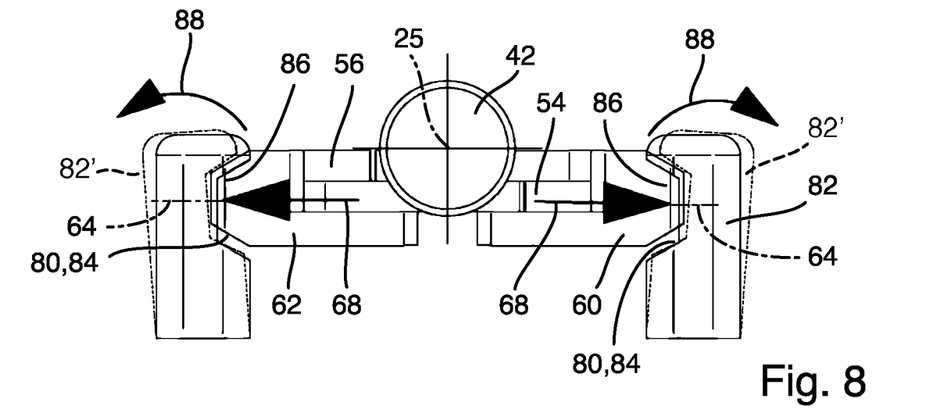
FIG. 8 is a cross section corresponding to FIG. 7 in the locking position.

In order to ensure a sufficient preloading force in the locking position, the bridge portions 82 together with the receptacles 80 are arranged on the changing unit 14 in a partially elastically yielding manner. In particular, the bridge portions 82 can be provided on the changing unit 14 such that they can be deflected by means of spring elements. If, as shown in FIG. 8, the locking elements 60, 62 are acted on along the arrows 68 against the receptacles 80 in the locking position, said receptacles are deflected into the deflection position 82' shown by dashed lines in FIG. 8. The advantage of this is that it is possible to reliably compensate for play that occurs, for example, due to tolerances. The deflection of the bridge portions 82 or the receptacles 80 is greater than the overall tolerance.

The invention claimed is:

1. Tool changer for a robot, comprising a base unit, a changing unit which can be locked on the base unit, movable locking elements which are provided on the base unit, and receptacles which are provided on the changing unit, the locking elements interacting with the receptacles in a locking position in order to lock the changing unit on the base unit and releasing the receptacles in an unlocking position, said tool changer also comprising a rotary element which is provided on the base unit and is rotatably mounted about its longitudinal axis, the locking elements being movement-coupled to the rotary element in such a way that the locking elements are moved when the rotary element is rotated, characterized in that the rotary element is movement-coupled to a rotationally fixed and axially movable actuation element such that, when the rotary element is rotated, the actuation element changes its position in the axial direction, in that the actuation element is movement-coupled to or forms a pivot pin which extends perpendicularly to the longitudinal axis of the actuation element, in that a joint pin is provided on each of the locking elements, and in that, between the pivot pin and each joint pin, at least one lever arm is provided such that, when the pivot pin is moved in the axial direction, the joint pins and thus also the locking elements are moved in a perpendicular direction running perpendicularly to the axial direction, wherein the rotary element comprises a head and a threaded rod, the head being rotatable by means of a rotary tool and the threaded rod being rotatably mounted in a threaded sleeve that is arranged on the base unit in a rotationally fixed manner.

2. Tool changer according to claim 1, characterized in that the actuation element adjoins the rotary element on the side of the rotary element facing away from the head so as to be rotationally decoupled in the axial direction.

3. Tool changer according to claim 1, characterized in that the head has an engagement surface for the rotary tool and in that a securing element which interacts with the engagement surface in order to prevent rotation of the rotary element is provided on the base unit, the securing element being designed in such a way that it disengages from a securing position into a release position when the rotary tool is placed on the head or when the rotary tool is rotated.

4. Tool changer according to claim 1, characterized in that the at least one lever arm comprises two lever arms that are arranged one above the other and so as to adjoin one another, at least in portions.

5. Tool changer according to claim 1, characterized in that the locking elements are designed as slide elements mounted so as to be guided in pockets of the base unit.

6. Tool changer according to claim 5, characterized in that the slide elements have wedge portions on the side facing the respective receptacles and in that the receptacles are designed as wedge receptacles.

7. Tool changer according to claim 1, characterized in that the receptacles are designed to be at least partially elastically yielding when the locking position is reached.

8. Tool changer according to claim 7, characterized in that the receptacles are arranged on the changing unit so as to be at least partially elastically yielding when the locking position is reached.

9. Tool changer for a robot, comprising a base unit, a changing unit which can be locked on the base unit, movable locking elements which are provided on the base unit, and receptacles which are provided on the changing unit, the locking elements interacting with the receptacles in a locking position in order to lock the changing unit on the base unit and releasing the receptacles in an unlocking position, said tool changer also comprising a rotary element which is provided on the base unit and is rotatably mounted about its longitudinal axis, the locking elements being movement-coupled to the rotary element in such a way that the locking elements are moved when the rotary element is rotated, characterized in that the rotary element is movement-coupled to a rotationally fixed and axially movable actuation element such that, when the rotary element is rotated, the actuation element changes its position in the axial direction, in that the actuation element is movement-coupled to or forms a pivot pin which extends perpendicularly to the longitudinal axis of the actuation element, in that a joint pin is provided on each of the locking elements, and in that, between the pivot pin and each joint pin, at least one lever arm is provided such that, when the pivot pin is moved in the axial direction, the joint pins and thus also the locking elements are moved in a perpendicular direction running perpendicularly to the axial direction, characterized in that, in the unlocking position, the connecting axes between the respective joint pins and the pivot pin forms an angle $\alpha$ with the axial direction in the range of from 30° to 60° and in that, in the locking position, the connecting axes between the respective joint pins and the pivot pin form an angle $\alpha$ with the axial direction in the range of from under 91° to over 90°.

10. Tool changer for a robot, comprising a base unit, a changing unit which can be locked on the base unit, movable locking elements which are provided on the base unit, and receptacles which are provided on the changing unit, the locking elements interacting with the receptacles in a locking position in order to lock the changing unit on the base unit and releasing the receptacles in an unlocking position, said tool changer also comprising a rotary element which is provided on the base unit and is rotatably mounted about its longitudinal axis, the locking elements being movement-coupled to the rotary element in such a way that the locking elements are moved when the rotary element is rotated, characterized in that the rotary element is movement-coupled to a rotationally fixed and axially movable actuation element such that, when the rotary element is rotated, the actuation element changes its position in the axial direction, in that the actuation element is movement-coupled to or forms a pivot pin which extends perpendicularly to the longitudinal axis of the actuation element, in that a joint pin is provided on each of the locking elements, and in that, between the pivot pin and each joint pin, at least one lever arm is provided such that, when the pivot pin is moved in the axial direction, the joint pins and thus also the locking elements are moved in a perpendicular direction running perpendicularly to the axial direction, characterized in that a displaceable axial stop is provided for adjusting the end position of the actuation element in the axial direction.

11. Tool changer for a robot, comprising a base unit, a changing unit which can be locked on the base unit, movable locking elements which are provided on the base unit, and receptacles which are provided on the changing unit, the locking elements interacting with the receptacles in a locking position in order to lock the changing unit on the base unit and releasing the receptacles in an unlocking position, said tool changer also comprising a rotary element which is provided on the base unit and is rotatably mounted about its longitudinal axis, the locking elements being movement-coupled to the rotary element in such a way that the locking elements are moved when the rotary element is rotated, characterized in that the rotary element is movement-coupled to a rotationally fixed and axially movable actuation element such that, when the rotary element is rotated, the actuation element changes its position in the axial direction, in that the actuation element is movement-coupled to or forms a pivot pin which extends perpendicularly to the longitudinal axis of the actuation element, in that a joint pin is provided on each of the locking elements, and in that, between the pivot pin and each joint pin, at least one lever arm is provided such that, when the pivot pin is moved in the axial direction, the joint pins and thus also the locking elements are moved in a perpendicular direction running perpendicularly to the axial direction, characterized in that positioning recesses or positioning rods by means of which the changing unit can be positioned at a changing station are provided on the changing unit.

\* \* \* \* \*